May 19, 1964 A. J. DE VRIES 3,133,993

STEREO FM TRANSMISSION SYSTEM

Filed April 18, 1960 3 Sheets-Sheet 1

INVENTOR.
Adrian J. De Vries
BY Francis W. Crotty
Atty.

INVENTOR.
Adrian J. De Vries
BY Francis W. Crotty
Atty.

STEREO FM TRANSMISSION SYSTEM

Filed April 18, 1960

3 Sheets-Sheet 3

INVENTOR.
Adrian J. De Vries
BY
Francis W. Crotty
Atty.

3,133,993

STEREO FM TRANSMISSION SYSTEM

Adrian J. De Vries, Elmhurst, Ill., assignor to Zenith Radio Corporation, a corporation of Delaware Filed Apr. 18, 1960, Ser. No. 22,830
14 Claims. (Cl. 179—15)

This invention relates to a new and improved transmission system and more particularly to a stereo FM transmission system which is compatible with existing monaural FM standards.

In the copending application of Robert Adler et al., Serial No. 22,926, entitled Stereo FM Transmission System, and filed concurrently herewith, there is described a stereo FM transmission system in which two substantially independent audio signals are transmitted over a single FM channel. In that system, the two audio signals are initially multiplexed on a time-division basis, the multiplexed or modulated signals being combined to produce sum and difference signals. These sum and difference signals are subsequently combined to develop a composite modulation signal representative of both audio signals. This composite signal is then utilized to modulate a high-frequency carrier, in conventional manner, to develop a transmission signal. In the receiver, the transmitted signal is first demodulated in the usual manner and is subsequently applied to a high-frequency switching device, synchronized with the multiplexing apparatus of the transmitter, to reconstitute the initial audio signals. The transmitted signal of the Adler et al. system is compatible with existing FM standards in that it can be received and utilized by a conventional FM receiver, which produces an output representative of the sum of the two stereo signals.

A related system of FM stereo transmission is described in the copending application of Carl G. Eilers, Serial No. 23,030, entitled Stereo FM Transmission System, and also filed concurrently herewith. In the Eilers system, the two stereo signals are initially added together to produce a sum signal which is used directly for frequency modulation of the transmission carrier. The stereo signals are also combined to produce a difference signal and this difference signal is used to amplitude-modulate a subcarrier signal having a frequency substantially greater than, preferably more than twice, the highest audio frequency to be transmitted. Suppressed-carrier amplitude modulation of the subcarrier is employed with respect to the difference signal. The amplitude-modulated subcarrier is also utilized to frequency modulate the transmission carrier. In addition, a relatively low-level pilot carrier or synchronization signal, locked in phase and frequency to the subcarrier, is utilized as a part of the frequency modulation signal. This pilot signal, which may advantageously have a frequency of half the fundamental of the subcarrier, is employed to accomplish synchronous detection at receiver stations.

The present invention is directed to still further improvements in such a stereo FM transmission system. One feature pertains to the construction of a novel receiver which is effective to reproduce the transmitted stereo signal.

In another aspect, the present invention provides for a modification of the transmission system to permit an increase in the portion of the available deviation in a given FM channel devoted to transmission of the difference signal by changing the transmitted pilot carrier or synchronization signal to a relatively minor extent. Furthermore, this modification of the transmitter results in simplification of the receiver construction, thereby reducing the cost of the stereo receiver without any sacrifice in the quality of reproduction.

A principal object of the invention, therefore, is to provide a new and improved stereo FM receiver which may be utilized to reproduce either a time-division multiplex stereo signal or a stereo signal in which a portion of the information is transmitted in the form of an amplitude-modulated subcarrier signal.

A further object of the invention is to provide a new and improved stereo FM receiver which does not require the development of sum and difference signals, but which reproduces the desired audio signals by direct demodulation of the received signal.

An additional object of the invention is to afford a new and improved stereo FM transmission system which provides maximum efficiency in utilization of available deviation with respect to the transmission of stereo information.

Another object of the invention is to provide, in a stereo FM transmission system, for the transmission of a pilot carrier in predetermined phase relation to a suppressed-carrier-modulated subcarrier signal to increase the deviation available for transmission of the modulated subcarrier and at the same time reduce the cost and complexity of receiver circuits.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

Figures 1, 5, 6:
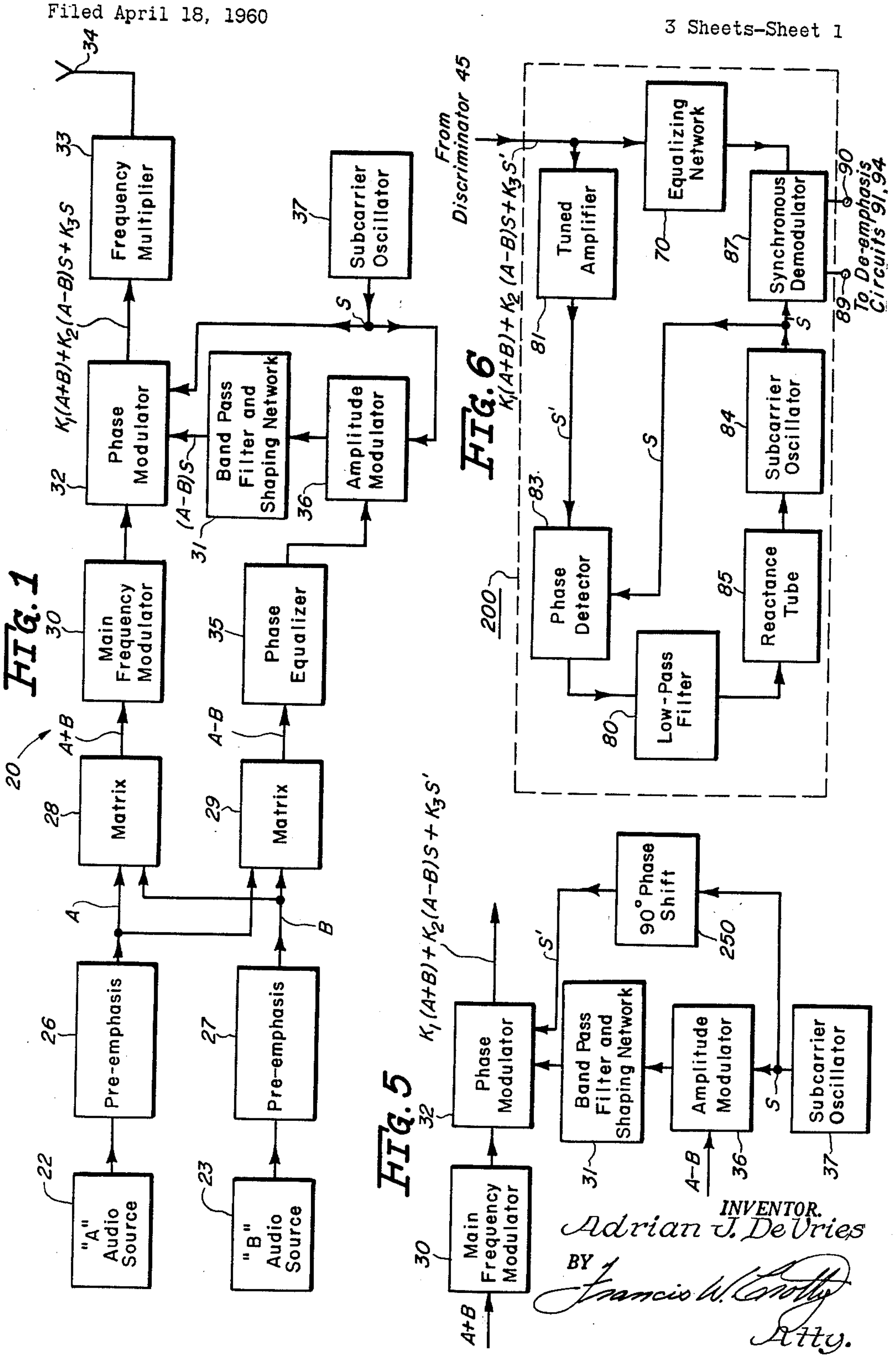
FIGURE 1 is a simplified block diagram of a stereo FM transmitter.
FIGURE 5 is a block diagram illustrating a modification of the FM stereo transmitter, constructed in accordance with another embodiment of the invention.
FIGURE 6 is a block diagram of a receiver for responding to the signal developed by the transmitter modification of FIGURE 5.
Figure 2:
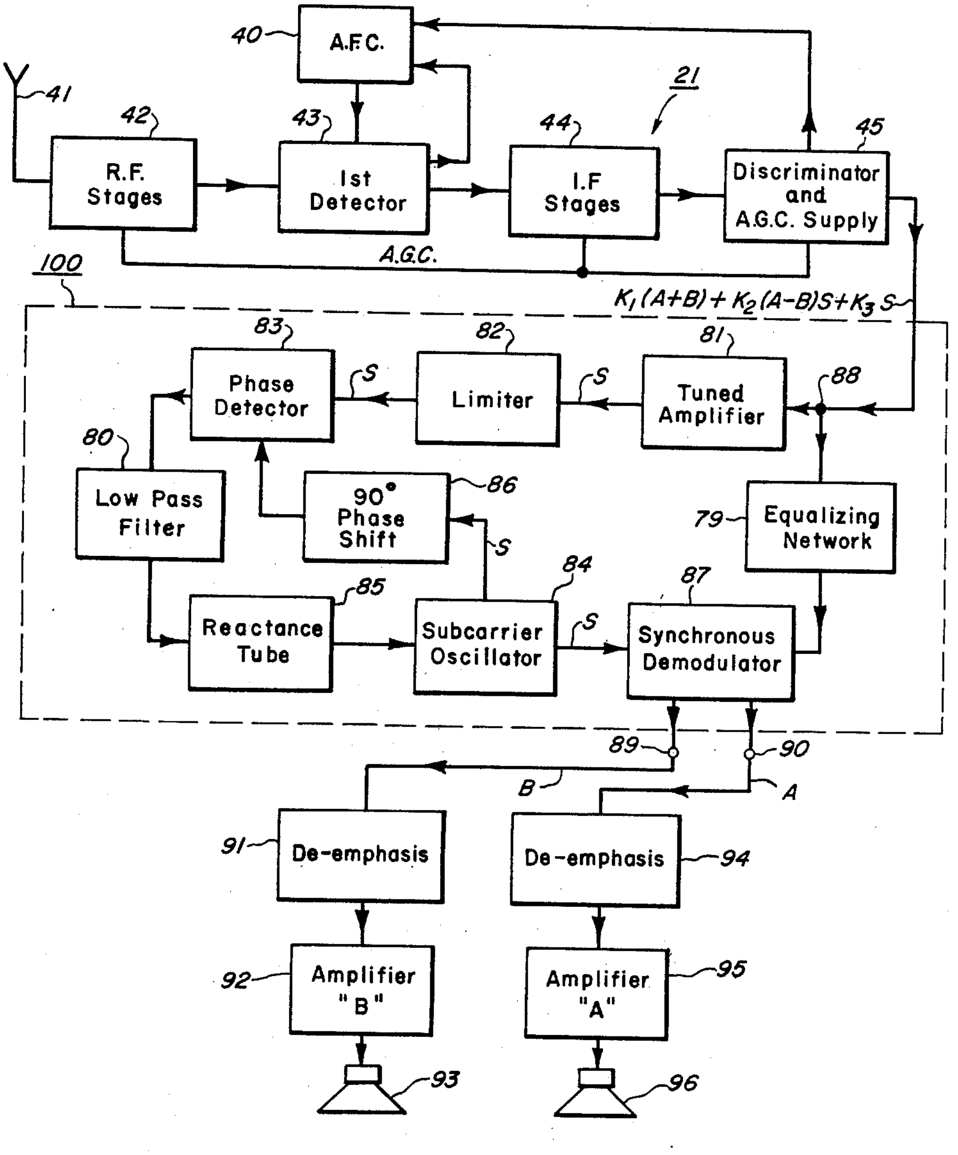
FIGURE 2 is a simplified block diagram of a receiver constructed in accordance with one embodiment of the invention.

FIGURE 1 illustrates a stereo FM transmitter 20 which, taken in conjunction with the receiver 21 illustrated in FIGURE 2, constitutes a complete FM stereo system which is compatible with current monaural FM broadcasting standards. Transmitter 20 comprises a first audio source 22 and a second audio source 23. Audio source 22 may comprise an individual microphone, one of two pickup circuits of a record player capable of reproducing a stereo recording, or any other suitable source of audio signals. Similarly, source 23 may comprise any suitable source of audio signals; in a stereo system, of course, the two sources are related to each other. The audio signal A from source 22 may be represented by the following expression:

$$A = \cos \omega_A t \qquad (1)$$

Similarly, the output signal B from audio source 23, may be represented by the following expression:

$$B = \cos \omega_B t \qquad (2)$$

Audio sources 22 and 23 are individually coupled to a pair of conventional pre-emphasis circuits 26 and 27, respectively. Pre-emphasis circuit 26 is connected to a first matrix or adder circuit 28, whereas pre-emphasis circuit 27 is coupled to a second matrix or subtraction circuit 29. In addition, circuit 26 is connected to matrix 29 and circuit 27 is coupled to matrix 28.

The output of matrix 28 is coupled to a frequency modulator 30 which will be assumed to include an oscillator for supplying a signal to be modulated by the signal from matrix 28. Modulator 30 comprises one modulation stage in a frequency-modulation system of known construction that also includes a second modulator 32, sometimes referred to as the phase modulation stage of the transmitter. Actually, both circuits 30 and 32 are effective to frequency-modulate an applied signal, the illustrated system affording two modulation stages in a single transmitter. The second modulation stage 32 is coupled to the output of the main modulator 30 and has an output circuit coupled to a frequency multiplier 33 which may include one or more multiplication stages, depending upon the center frequency of the desired signal to be radiated from the transmitter antenna 34.

The output of matrix 29 is coupled to a phase equalization circuit 35 which, in turn, is coupled to an amplitude modulator circuit 36 preferably of the suppressed-carrier type. Modulator 36 is also coupled to the output of a subcarrier oscillator 37 which develops a substantially sinusoidal subcarrier signal S which may be represented as $$S=\cos \omega_S t \qquad (3)$$

The frequency of the subcarrier signal S is substantially greater than, and by preference is more than twice, the highest audio frequency to be transmitted. Thus, the operating frequency of oscillator 37 may be of the order of thirty to fifty kilocycles. The output of modulator 36 is coupled to the second frequency modulation stage 32 of the transmitter through a band-pass filter and shaping network 31. The filter serves to restrict the modulation components of the signal delivered from modulator 36, as described more particularly hereinafter, and the wave shaper operates on that signal by the factor $1/f$, where $f$ designates frequency, to make the customary conversion from phase to frequency modulation.

At the outset, each of the audio signals from sources 22 and 23 is pre-emphasized to attenuate the low-frequency portion of each audio signal relative to the high-frequency components in order to obtain a noise advantage as is well understood. Following pre-emphasis, audio signals A and B are applied to mixer 28 which additively combines the two signals to produce an output signal of the form $A+B$. This signal is applied to frequency-modulator 30 and is modulated therein with the carrier signal developed by the oscillator assumed to be included within this stage in accordance with conventional practice.

The two signals A and B are also applied, after pre-emphasis, to mixer 29, which combines them in proper phase relation to provide an output signal of the form $A-B$. This difference signal is transmitted through phase equalization circuit 35 and is applied to amplitude modulator 36 wherein it is amplitude-modulated with subcarrier signal S to develop a suppressed-carrier amplitude-modulated subcarrier signal of the form:

$$(A-B)S \qquad (4)$$

This amplitude-modulated subcarrier signal is applied to the second frequency modulation stage 32 of the transmitter to further modulate the frequency of the output signal from the modulator stage 30. It may also be desirable to couple subcarrier oscillator 37 to modulator 32, as shown in FIGURE 1, to provide for the transmission of the subcarrier signal in unmodulated form as a pilot signal to synchronize demodulation at receivers; this separate coupling from oscillator 37 may be unnecessary if amplitude modulator 36 is constructed to deliver the subcarrier at very low amplitude to modulator 32. The resultant output signal derived from modulation stage 32 is of the general form of a carrier signal, at the base frequency of the oscillator included in unit 30, which is frequency-modulated in accordance with the function $$M(t)=K_1(A+B)+K_2(A-B)S+K_3S \qquad (5)$$

This signal is further multiplied in frequency in circuit 33 and is radiated from transmitter antenna 34. For example, the carrier frequency at stage 30 may be 11.0555 megacycles and multiplier 33 may include two tripling stages, affording an FM output signal having a center frequency of 99.5 megacycles.

Figure 3:
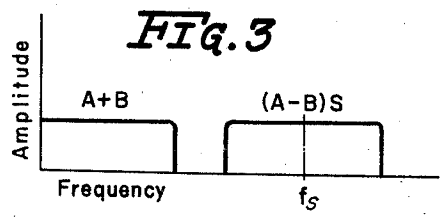
FIGURE 3 illustrates the frequency distribution of the transmitted signal.

The frequency distribution or spectrum of the composite modulation signal of the radiated carrier is illustrated in FIGURE 3. The low-frequency end of the frequency diagram, designated $(A+B)$, represents the sum of the A and B signals, whereas the high-frequency portion, designated $(A-B)S$, represents the difference of the A and B signals multiplied by the subcarrier signal S. The ordinate $fs$ corresponds to the pilot signal which is included in the modulation for synchronization purposes. All of the necessary audio signal information is included in this composite modulation and unwanted modulation products are obviated by filter 31 which limits the output of modulator 36 to the modulation components adjacent the fundamental frequency of subcarrier signal S.

To optimize the signal-to-noise ratio, it is desirable to keep the subcarrier frequency as low as practicable. Thus, a subcarrier frequency in the range from thirty to fifty kilocycles is preferred. Adequate subcarrier information can be transmitted with a pilot carrier frequency swing of five kilocycles. Thus, for a total deviation of seventy-five kilocycles, the following constants may be employed:

$K_1$=70 kilocycles/second
$K_2$=70 kilocycles/second
$K_3$=5 kilocycles/second

As explained in the aforesaid Adler et al. application, it is preferred that constants $K_1$ and $K_2$ be equal in order that the sum and difference signals may have the same peak amplitude. This condition may be established by controlling the gain in those portions of the transmitter which operate on the sum and difference signals, respectively. The transmitter of FIGURE 1 is described in greater detail and claimed in the above-mentioned Eilers application.

FIGURE 2 illustrates, in block diagram form, a receiver 21 constructed in accordance with one embodiment of the present invention to reproduce a stereo broadcast radiated from the transmitter of FIGURE 1 or from any transmission wherein the composite modulation corresponds to the function $M(t)$ of Equation 5, however it may be derived. This receiver comprises an antenna 41, a radio-frequency amplifier 42, a first detector 43, an intermediate-frequency amplifier 44, and a discriminator-limiter 45, all of which may be substantially conventional in construction.

As explained in the Adler et al. application, it is desirable that the receiver have superior characteristics to those of the present-day commercially available monaural FM receiver. In particular, it is preferred that the receiver have high sensitivity so that the stereophonic signal-to-noise ratio is acceptable in fringe areas, its AM rejection properties are to be improved and its bandwidth characteristics should be better than that usually encountered in present-day monaural receivers. Accordingly, the receiver of FIGURE 2 includes an AGC source within discriminator 45 and an AGC bus which applies control potential to both the RF and IF amplifiers. Also, the oscillator of detector 43 is controlled as to frequency by an AFC control 40 which is connected to the local oscillator of detector 43 and to discriminator 45 to receive therefrom signals which are compared in the usual way to derive an AFC control potential. The IF bandwidth is increased from its usual value of 150–180 kc. at the −6 decibel point to approximately 230 kc. Added AM rejection is provided by the use of two limiters or a single limiter and a ratio detector which contributes amplitude limiting effects. The bandwidth of the detector is about 300 kc.

The discriminator is connected to a frequency-selective amplifier 81 which is tuned to the fundamental frequency of the subcarrier signal S. The output of amplifier 81 is coupled to a limiter 82, which in turn is coupled to a phase detector 83. The phase detector 83 is connected in an APC loop comprising a subcarrier oscillator 84, a low pass filter 80, a reactance tube 85, and a phase shifting circuit 86. Oscillator 84 is also coupled to a synchronous demodulator 87, demodulator 87 being further coupled to the output of discriminator 45 through an equalizing network 79. Demodulator 87 includes two output circuits, identified by the terminals 89 and 90. Output terminal 89 is coupled to a de-emphasis circuit 91 of conventional construction which, in turn, is coupled to a suitable amplifier 92 that drives a loudspeaker or other transducer 93. Similarly, output terminal 90 of demodulator 87 is coupled to a utilization circuit, comprising, in series, a de-emphasis circuit 94, an amplifier 95, and a suitable speaker or other transducer 96.

Figures 4, 7:
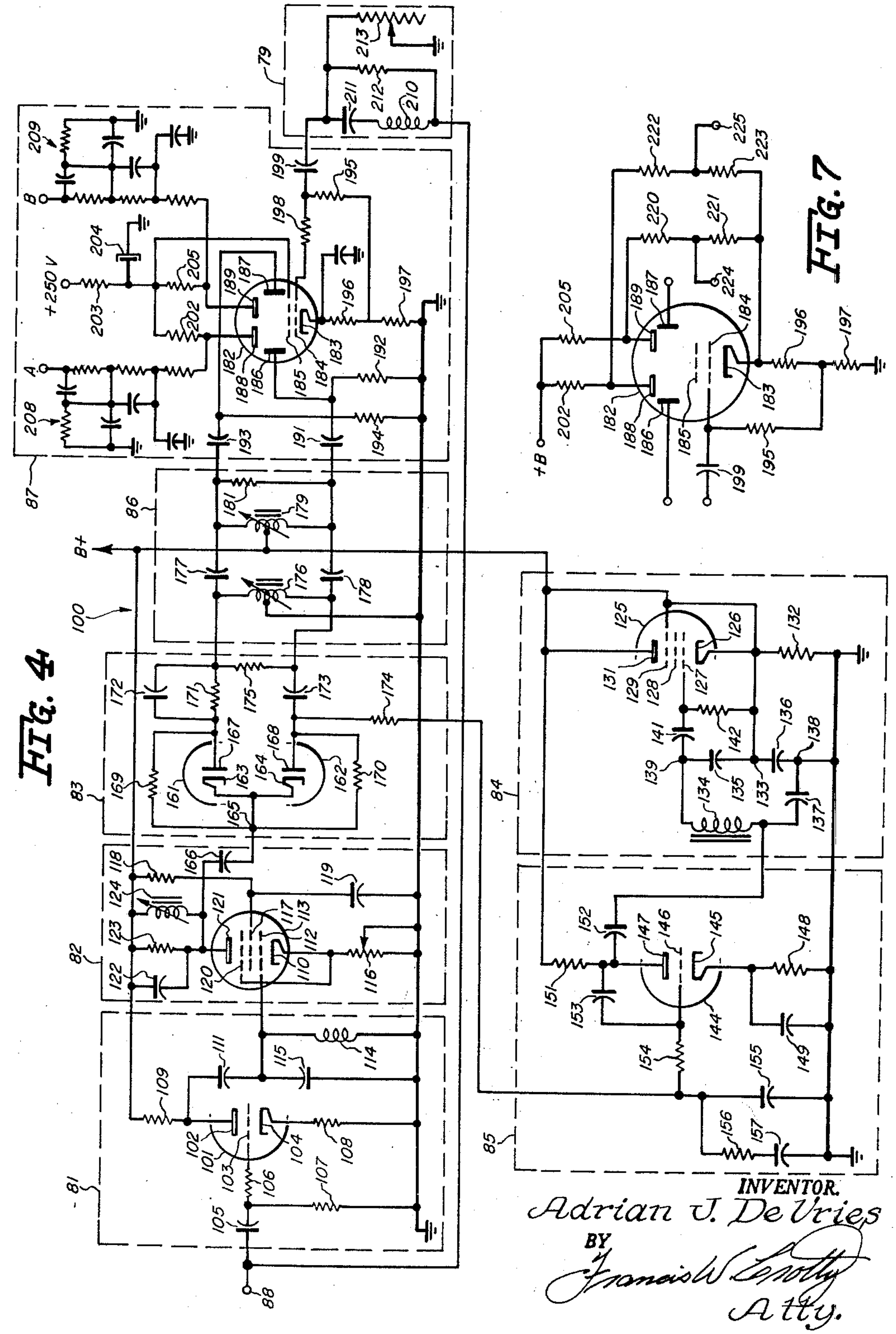
FIGURE 4 is a detailed circuit diagram of certain circuits incorporated in the receiver of FIGURE 2.
FIGURE 7 is a further modification of the stereo receiver.

FIGURE 4 is a detailed schematic diagram of the operating circuits for the stereo demodulation system 100 enclosed in dash outline in FIGURE 2. Subcarrier amplifier 81 comprises a triode section 101 having an anode 102, a control electrode 103 and a cathode 104. The input circuit to the amplifier includes a coupling capacitor 105 connected, in series with a resistor 106, to control electrode 103. The input circuit further includes a resistor 107 which is connected to the common terminal of impedances 105 and 106 and is returned to a plane of reference potential, here indicated as ground.

Cathode 104 of amplifier tube 101 is returned to ground through a bias resistor 108. Anode 102 is connected to a suitable B+ supply by means of a load resistor 109. The output circuit for amplifier 81 includes a coupling capacitor 111 which is connected to anode 102 and to the control electrode 112 of a pentode 113 incorporated in limiter circuit 82. A parallel resonant circuit, tuned to the frequency of the subcarrier S, is incorporated in the output circuit of amplifier 81 and comprises an inductance 114 and a capacitor 115 connected in parallel with each other between coupling capacitor 111 and ground.

In limiter circuit 82, the cathode 110 and the shield electrode 120 are connected to each other and are returned to ground through a potentiometer 116. The screen electrode 117 is connected to the B+ supply through a resistor 118 and is bypassed to ground for high frequencies by a capacitor 119. The output circuit for limiter tube 113, connected to the anode 121, comprises a capacitor 122, a resistor 123, and an inductance 124 all connected in parallel with each other between the anode and the B+ supply. The parallel-resonant circuit afforded by impedances 122 and 124 is also adjusted to be resonant at the frequency of subcarrier S.

Subcarrier oscillator 84 is of conventional construction and comprises a pentode section 125 having a cathode 126, a control electrode 127, a screen electrode 128, a shield or suppressor electrode 129, and an anode 131. Tube 125 is connected in a substantially conventional oscillator circuit of the Colpitts type. Thus, cathode 126 is connected to electrode 129 and is returned to ground through a resistor 132. The cathode is also connected to the center terminal 133 of the capacitor side of a tuned parallel-resonant circuit comprising a variable inductance 134 and a pair of capacitors 135 and 136, capacitor 136 being connected back to coil 134 through a relatively small coupling capacitor 137. The common terminal 138 between capacitors 136 and 137 is grounded. The other terminal 139 of the resonant circuit is coupled to control electrode 127 by means of a circuit comprising a series coupling capacitor 141 and a shunt resistor 142 which is connected back to cathode 126. Both anode 131 and screen electrode 128 are directly connected to the B+ supply.

Reactance tube circuit 85 is also substantially conventional in construction and comprises a triode section 144 including a cathode 145, a control electrode 146, and an anode 147. Cathode 145 is returned to ground through a bias circuit comprising a resistor 148 and a capacitor 149 which is connected in parallel with resistor 148. Anode 147 of triode 144 is connected to the B+ supply by means of a load resistor 151 and is coupled to one end of the main inductance coil 134 of oscillator 84 by means of a coupling capacitor 152. Anode 147 is also coupled to control electrode 146 by means of a capacitor 153 which comprises the principal reactance of the reactance tube circuit. The input circuit to reactance tube 144 includes a series resistor 154 which is connected to control electrode 146, the other terminal of resistor 154 being returned to ground through a parallel circuit, comprising in one branch, a capacitor 155, and in the other branch, the series combination of a resistor 156 and a capacitor 157. This network, plus resistor 174, constitute the low-pass filter 80 of FIGURE 2.

As indicated in FIGURE 2, the input circuit of reactance tube 85 is coupled to synchronous detector 83 through filter 80, and the output circuit of oscillator 84 is coupled to the detector to apply an input signal thereto. In the specific detector-circuit shown in FIGURE 4, phase detector 83 comprises two diode sections 161 and 162. The cathodes 163 and 164 of the two diode sections are connected to each other and to an input terminal 165 which is coupled to anode 121 of limiter circuit 82 by means of a coupling capacitor 166. Input terminal 165 is also connected to the two anodes 167 and 168 of the detector by means of a pair of resistors 169 and 170, respectively. Detector 83 further includes a push-pull input circuit, connected to the two anodes 167 and 168. Thus, anode 167 is connected to a parallel RC circuit comprising a resistor 171 and a coupling capacitor 172. The corresponding circuit connected to anode 168 comprises a coupling capacitor 173, but in this instance the resistive portion of the circuit comprises a resistor 174 which is connected back to the series input resistor 154 of reactance tube circuit 85. A resistor 175 is connected across the push-pull input of the detector, and this input stage is connected to phase shifting circuit 86.

Phase shifter 86 includes a variable inductance 176 that is connected in parallel with the resistor 175; the inductance 176 is provided with a center tap that is returned to ground. A pair of coupling capacitors 177 and 178 are connected to the opposite terminals of coil 176 and are utilized to couple the input stage of detector 83 to a second variable inductance 179. Inductance 179 is also provided with a center tap which in this instance is connected to anode 131 of subcarrier oscillator 84 to afford a means for applying the output signal of the oscillator to synchronous detector 83 and also to synchronous demodulator 87. A resistor 181 is connected in parallel with the phase-shifting inductance 179.

Synchronous demodulator 87 comprises a beam deflection tube 182 including a cathode 183, a control electrode 184, a screen electrode 185, a pair of deflection electrodes 186 and 187, and a pair of output electrodes or anodes 188 and 189. Deflector 186 is coupled to one side of the coil 179 by means of an input circuit comprising a series coupling capacitor 191 and input resistor 192, resistor 192 being returned to ground. Similarly, deflector 187 is coupled to the other side of coil 179 by means of an input circuit including a series coupling capacitor 193 and a load resistor 194.

Cathode 183 of beam deflection tube 182 is returned to ground through a circuit comprising, in series, a pair of resistors 196 and 197, which are bypassed by a suitable capacitor. Control electrode 184, on the other hand, is coupled to an input circuit which is utilized to apply an input signal to the demodulator from equalizing network 79. This input circuit comprises a coupling resistor 198 which is connected in series with a coupling capacitor 199 between control electrode 184 and the equalizing network. This network comprises an inductance 210 in series with a capacitor 211, shunted by a resistor 212. The junction of capacitor 211 and resistor 212 is grounded through the adjustable tap of a variable resistor 213. Network 79 also connects to terminal 88 and its purpose will be made clear hereinafter. The input circuit of the deflection tube further includes a shunt resistor 195 which is returned to the common terminal of the two resistors 196 and 197 in the cathode circuit.

In the output circuit of beam deflection tube 182, the anode 188 is connected to the B+ supply through a circuit comprising, in series, a resistor 202 and a resistor 203, resistor 203 being bypassed to ground by a capacitor 204. Similarly, anode 189 is returned to the B+ supply through a load circuit comprising a load resistor 205 connected in series with resistor 203. Screen electrode 185 is connected to the common terminal of the load resistors 202 and 205 to afford a biasing circuit for this electrode. Anode 188 is connected to output terminal 90 of the demodulator by means of a low-pass RC filter circuit generally indicated by the reference numeral 208, whereas anode 189 of the beam deflection tube is coupled to the other output terminal 89 by means of a similar RC filter circuit 209. The filter circuits 208 and 209 are designed to provide de-emphasis in the usual manner and to attenuate signal frequencies at the frequency of the switching signal applied to deflectors 186, 187 because the switching component may be large enough to cause overload in succeeding amplifiers of the receiver. Thus, the described circuit of FIGURE 4 also includes de-emphasis networks 91 and 94.

In considering the operation of the receiver of FIGURES 2 and 4, it may be considered that the signal appearing at input terminal 88 of the stereo demodulation system 100 is of the general form set forth in Equation 5. This signal is applied to tuned amplifier 81 which selects the pilot or subcarrier signal and applies it to control electrode 112 of limiter tube 113. The output signal from the limiter is applied to phase detector 83 in push-push relation, being applied to the cathodes of diodes 161 and 162. At the same time, oscillator 84 develops an output signal at approximately the frequency of the subcarrier signal, and this signal is applied, through 90° phase shifting circuit 86, in push-pull relation to the diodes of phase detector 83. The phase detector operates in conventional manner to develop an output signal representative of phase differences between the two applied signals, and this output signal is applied to reactance tube 144 through low-pass filter 80. The conductive condition of the reactance tube determines the reactance it contributes to the frequency-determining circuit of oscillator 84 and the effective operating frequency of the oscillator. In this manner, oscillator 84 is established and maintained in phase and frequency synchronization with subcarrier signal S as represented by the pilot-signal modulation component of the received transmission.

The composite modulation signal of Equation 5, appearing at terminal 88, is also applied through equalizing network 79 to control electrode 184 of beam deflection tube 182 and is effective to modulate the intensity of the electron beam developed in the tube. The output signal from subcarrier oscillator 84, representative of subcarrier S, is applied in push-pull relation to deflectors 186 and 187 to swing the electron beam between anodes 188 and 189. Tube 182 functions as a synchronous demodulator affording two distinct output signals at the anodes 188 and 189. One of these output signals is directly representative of the initial audio signal A, and the other is directly representative of the initial audio signal B, no further matrixing being required in the receiver.

In the Adler et al. application it is explained that the ideal transmission is that of Equation 5 herein with constant $K_1$ equal to constant $K_2$. It is further explained that if this condition is modified by arranging that the ratio of the coefficient $K_1$ to $K_2$ is $2/\pi$, the desired signals A and B may be derived by operating upon the composite modulation signal with a signal of approximately square wave form. This is the same operation accomplished in the receiver of FIGURE 2. The coefficients are suitably modified in network 79 and the square wave signal is, in effect, the signal applied to deflectors 186, 187 from oscillator 84. If the peak-to-peak amplitude of the signal from this oscillator is large enough, its slope at its crossings of the A.-C. axis is steep enough to have the same effect in deflecting the beam of tube 182 as a deflection signal of square wave form. Consequently, the required A and B signals are developed in the output circuits of tube 182. Of course, the output signals also include components representative of the subcarrier S, since this signal is included in the composite signal applied to control electrode 184 of the beam deflection demodulator. However, this portion of the output signals is effectively attenuated by the filters 208 and 209 which also accomplish de-emphasis. Accordingly, the output signals obtained from filters 208, 209 are the desired audio signals A and B of Equations 1 and 2. The A signal is utilized to drive amplifier 92 and loudspeaker 93, while the B signal is amplified in circuit 95 and is employed to drive the second loudspeaker 96.

The receiver of FIGURE 2 is relatively simple and inexpensive in construction and is generally similar to a conventional FM receiver except for the incorporation therein of demodulation system 100. Demodulation system 100 is highly effective and accurate in reconstituting the initial audio signals A and B and presents none of the difficulties usually atendant upon separate demodulation to develop sum and difference signals $(A+B)$ and $(A-B)$ followed by matrixing to recover the A and B signals. The described demodulation system presents little or no difficulty with respect to differential delay or attenuation between the two audio signals. Relatively simple and convenient adjustment of the phase shifting circuit 86, and particularly the variable inductance 179 (see FIGURE 4) is effective to maintain accurate phase synchronization in the demodulation process, thereby avoiding distortion which might otherwise occur.

Circuit parameters for demodulation system 100, FIGURE 4, are set forth in detail hereinafter, affording substantially complete specific circuit data for the major circuits of the system. It should be understood, however, that these data are furnished solely by way of illustration and in no sense as a limitation on the invention.

| Tube: | Type |
|---|---|
| **101** | ½6BN8 |
| **113** | 6BN6 |
| **125, 144** | 6AU8 |
| **161, 162** | ½6BN8 |
| **182** | 6AR8 |

| Resistors: | | Impedance |
|---|---|---|
| **106, 198** | ohms | 100 |
| **107, 108, 195** | kilohms | 470 |
| **116, 197** | do | 1 |
| **118, 194** | do | 100 |
| **123** | do | 18 |
| **132** | do | 6.2 |
| **142** | do | 47 |
| **148** | do | 2.7 |
| **151** | do | 33 |

| Resistors: | | Impedance |
| --- | --- | --- |
| 154 | kilohms | 10 |
| 156 | do | 6.8 |
| 169, 170 | do | 150 |
| 173, 174 | do | 330 |
| 175 | do | 22 |
| 181 | do | 15 |
| 196 | ohms | 680 |
| 202, 205 | kilohms | 3.3 |
| 203 | do | 3.5 |
| 212 | do | 4.7 |
| 213 | do | 25 |

| Capacitors: | | Capacitance |
| --- | --- | --- |
| 105, 111, 166, 191, 193 | microfarads | 0.01 |
| 115 | micromicrofarads | 330 |
| 119, 149, 199 | microfarads | 0.1 |
| 135, 136 | do | 0.022 |
| 137, 141 | micromicrofarads | 1100 |
| 152, 177, 178 | do | 470 |
| 153 | do | 68 |
| 155, 172, 174 | do | 3000 |
| 157 | microfarads | 4 |
| 204 | do | 10 |
| 211 | micromicrofarads | 1000 |

FIGURE 5 illustrates the modulator circuit of a transmitter, which is essentially similar to transmitter 20 of FIGURE 1, but in which the manner of transmitting the pilot or synchronization signal has been modified. In particular, subcarrier oscillator 37 is coupled to modulator 32 by means of a phase shifting circuit 250. This phase shifting circuit is constructed to afford a phase shift of 90° at the fundamental frequency of the subcarrier signal S and the output signal S' of phase shifting circuit 250 is of the form $$S'=\cos\ (w_S t+90°) \tag{6}$$

Otherwise the modulator and the transmiter into which it is incorporated may be the same as shown in FIGURE 1.

Accordingly, and as indicated in FIGURE 5, the output signal from phase modulator 32, in this instance, is in the form of a carrier which is frequency-modulated in accordance with the modulation function $M'(t)$, where $$M'(t)=K_1(A+B)+K_2(A-B)S+K_3S' \tag{7}$$

The transmitter of FIGURE 5 transmits essentially the same signal as the transmitter of FIGURE 1 except that the pilot-signal component of the transmitted signal is in phase quadrature with respect to the subcarrier for the $A-B$ information in the arrangement of FIGURE 5 whereas it is in phase with the subcarrier with the system of FIGURE 1. The phase-quadrature relation is of advantage because it increases modulation of the $A-B$ channel by nearly the amount otherwise devoted to the pilot signal. Furthermore, the receiver circuitry is simplified because the 90° phase shifting circuit 86 in the APC loop may be eliminated.

In a typical system constructed in accordance with this transmitter embodiment of the invention, the following constants may be employed where the maximum allowable deviation is 75 kilocycles:

$K_1$=70 kilocycles/second
$K_2$=74 kilocycles/second
$K_3$=5 kilocycles/second

FIGURE 6 illustrates a demodulation system 200 which may be utilized in receiver 21 instead of demodulation system 100 shown in FIGURE 2 to receive the transmission of the general form of Equation 7. It differs from the arrangement of FIGURE 2 in two respects: (1) the limiter between amplifier 81 and phase detector 83 is omitted and (2) oscillator 84 is directly connected to the phase detector; there is no need for phase shifting network 86. The two arrangements operate in generally the same way.

The preferred embodiments of the invention contemplate such operation that the A and B signals are obtained directly from the two output circuits of beam deflection tube 182 without the requirement of matrixing of the detected signals. It will be appreciated, however, that the synchronous detector may be operated to accommodate matrixing of the detected signals if this should be desired. An illustrative circuit arrangement, featuring matrixing of the detected output signals of the synchronous detector, is given in FIGURE 7. It will be observed that anode 189 is coupled to the cathode 183 through a pair of series-connected resistors 220, 221. Similarly, anode 188 is returned to the cathode through series-connected resistors 222 and 223. The A and B signals, for this specific embodiment, are derived at terminals 224 and 225 connected to the junctions of resistors 220, 221 on the one hand and resistors 222, 223 on the other.

A signal representing the composite modulation of the stereo transmission is applied to the terminal which connects with control electrode 184 and the deflection signal is applied in push-pull to the terminals connected to deflector electrodes 186 and 187. Ignoring the presence of the pilot signal, the composite modulation applied to grid 184 may be expressed by the following function:

$$M''(t)=(A+B)+(A-B)\ \cos\ \omega_{sc}t \tag{8}$$

If resistor 196 is large compared to one over the transconductance of the tube, the cathode potential $V_K$ may be expressed as follows:

$$V_K \cong (A+B)+(A-B)\ \cos\ \omega_{sc}t+V_{DC} \tag{9}$$

Assuming that the deflection signal may be considered to have the same effect as a signal of square wave form, for the reasons explained above, the function representing the effect of the deflection upon the composite modulation signal, in respect of anode 188, is as follows:

$$\frac{1}{2}+\frac{2}{\pi}\cos\ \omega_{sc}t-\frac{2}{3\pi}\cos^3\ \omega_{sc}t+\ \dots \tag{10}$$

and with respect to anode 189 the function is as follows:

$$\frac{1}{2}-\frac{2}{\pi}\cos\ \omega_{sc}t+\frac{2}{3\pi}\cos^3\ \omega_{sc}t-\ \dots \tag{11}$$

The only significant terms of Equations 10 and 11 are the first two; the high order harmonics may be neglected and the voltages developed across resistors 202 and 205 may be written as follows, respectively:

$$V_{202}=(+B)-K\cdot\frac{R_A}{R_K}\left(\frac{1}{2}+\frac{2}{\pi}\cos\ \omega_{sc}t\right).V_K \tag{12}$$

$$V_{205}=(+B)-K\ \frac{R_A}{R_K}\left(\frac{1}{2}-\frac{2}{\pi}\cos\ \omega_{sc}t\right).V_K \tag{13}$$

where K is a constant showing the ratio of anode current to total beam current, $R_A$ is the value of resistor 202 and $R_K$ is the cathode impedance to ground.

If one substitutes the value of $V_K$ in Equations 12 and 13, and takes cognizance only of the audible signal components, the significant signal voltages developed at anodes 188 and 189, respectievly, are as follows:

$$V_{202}=-K\frac{R_A}{R_K}\left(\frac{A+B}{2}+\frac{A-B}{\pi}\right) \tag{14}$$

$$V_{205}=-K\frac{R_A}{R_K}\left(\frac{A+B}{2}-\frac{A-B}{\pi}\right) \tag{15}$$

The voltage available at terminal 225 is as follows:

$$V_{225}=(1-p)V_{202}+pV_K \tag{16}$$

where $p$ is the ratio of the resistor 220 to the total resistance represented by resistors 220 and 221 in series.

Again, if the audible components alone are considered, Equation 16 becomes $$V_{225}=\left[-(1-p)K\frac{R_A}{R_K}\left(\frac{1}{2}+\frac{1}{\pi}\right)+p\right]A \quad (17)$$
$$+B\left[-(1-p)K\frac{R_A}{R_K}\left(\frac{1}{2}-\frac{1}{\pi}\right)+p\right]$$

By proper selection of $p$, $R_A$ and $R_K$ the final term of Equation 17 may be made equal to zero and Equation 17 becomes $$V_{225}=C_1A \quad (18)$$

where $C_1$ is a constant and A is the A program signal.

In like fashion it may be shown that the voltage available at terminal 224 is in accordance with:

$$V_{224}=C_2B \quad (19)$$

where $C_2$ is a constant and B is the other program signal.

In one embodiment of the arrangement of FIGURE 7 that has been found to operate satisfactorily, the following significant circuit parameters were employed $R_{195}$=470 kilohms
$R_{196}$=300 kilohms
$R_{197}$=1.8 kilohms
$R_{202}=R_{205}$=4.7 kilohms
$R_{220}=R_{222}$=150 kilohms
$R_{221}=R_{223}$=330 kilohms The desired A and B signals which are available at terminals 225 and 224, respectively, are applied through the de-emphasis and filter networks corresponding to networks 208 and 209 of the receiver of FIGURE 2 and hence to the A and B sound channels.

The described FM stereo transmission system exhibits all of the desirable attributes of the arrangement described in the above-identified Adler et al. application. It is compatible in that the transmission may be utilized by a present-day FM monaural receiver to produce high quality reproduction. The signal-to-noise ratio of the system, considered from the standpoint of monaural and stereophonic transmission, is acceptable and there is a minimum of cross talk between the main and sub-channels. It has the further advantage that this system may concurrently accommodate an auxiliary service such as that which is referred to as background music without materially deteriorating its performance with respect to monaural or stereophonic receivers.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A receiver for a stereo FM transmission system for utilizing a transmitted signal comprising a carrier frequency-modulated in accordance with the modulation function $$M_1t)=K_1(A+B)+K_2(A-B)\cos\omega_st+K_3S'$$

where A and B are audio signals, S' is a pilot signal related to the fundamental of a suppressed-carrier amplitude-modulated subcarrier signal $K_2(A-B)\cos\omega_st$ and $K_1$–$K_3$ are constants, comprising: a discriminator; input means for applying a received signal to said discriminator to develop a signal corresponding to said modulation function; means, comprising a band-pass filter coupled to said discriminator, for deriving a demodulation signal having a frequency S and fixed phase relation to said subcarrier; a synchronous demodulator including a beam-deflection tube having deflector electrodes, an intensity-control electrode and a pair of output electrodes; means for coupling said discriminator to said control electrode; means for applying said demodulation signal to said deflector electrodes, and means coupled to said output electrodes for developing a pair of audio signals corresponding to said audio signals A and B.

2. A receiver for a stereo FM transmission system for utilizing a transmitted signal comprising a carrier frequency-modulated in accordance with the approximate modulation function $$M(t)=K_1(A+B)+K_2(A-B)\cos\omega_st+K_3S'$$

where A and B are audio signals, S' is a pilot signal related to the fundamental of a suppressed-carrier amplitude-modulated subcarrier signal $K_2(A-B)\cos\omega_st$, and $K_1$–$K_3$ are constants, comprising: a discriminator; input means for applying a received signal to said discriminator to develop a signal corresponding to said modulation function; means for generating a demodulation signal having a frequency S and locked in phase therewith, said means comprising a band-pass filter coupled to said discriminator and having a narrow pass band centered at the frequency of said pilot signal, an oscillator, a signal-actuated variable reactance device, and a phase detector coupled to said filter, said oscillator, said variable reactance device and said phase detector being connected together in an automatic phase control feedback loop; a synchronous demodulator having first and second input circuits, said first input circuit being coupled to said discriminator, said demodulator further having two output circuits; and means for applying said demodulation signal to said second input circuit of said demodulator to develop a pair of audio signals, corresponding to said audio signals A and B, in said output circuits.

3. A receiver for a stereo FM transmission system for utilizing a transmitted signal comprising a carrier frequency-modulated in accordance with the approximate modulation function $$M(t)=(A+B)+(A-B)\cos\omega_st+KS'$$

where A and B are audio signals, S' is a pilot signal related to the fundamental of a suppressed-carrier amplitude-modulated subcarrier signal $(A-B)\cos\omega_st$, and K is a constant, comprising: a discriminator; input means for applying a received signal to said discriminator to develop a signal corresponding to said modulation function; means, coupled to said discriminator, for generating a demodulation signal having a frequency S, locked in phase coincidence therewith and having such peak-to-peak amplitude that the slope of its wave form at crossings of its a-c axis is sharp; a synchronous demodulator comprising a beam deflection tube having a cathode, a control electrode, a pair of deflector electrodes, and a pair of output electrodes, said control electrode being coupled to said discriminator to intensity modulate the electron beam in said tube in accordance with said modulation function; and means for applying said demodulation signal to said deflector electrodes to develop a pair of audio signals, corresponding to said audio signals A and B, at said output electrodes.

4. A receiver for a stereo FM transmission system for utilizing a transmitted signal comprising a carrier frequency-modulated in accordance with the approximate modulation function $$M(t)=K_1(A+B)+K_2(A-B)\cos\omega_st+K_3S'$$

where A and B are audio signals, $K_2(A-B)\cos\omega_st$ is suppressed-carrier amplitude-modulated subcarrier signal, S' is a pilot signal having the same frequency as the subcarrier but displaced 90° in phase, and $K_1$–$K_3$ are constants, comprising: a discriminator; input means for applying a received signal to said discriminator to develop a signal corresponding to said modulation function; means for generating a demodulation signal having a frequency S and locked in phase coincidence therewith, said means comprising a band pass filter coupled to said discriminator for isolating said pilot signal, a local oscillator operating at the subcarrier frequency, a phase detector coupled to said band pass filter and said oscillator, and reactance means coupled to said phase detector and said oscillator to control the phase of said oscillator in response to changes in the relative phase of said pilot signal and the output from said oscillator; a synchronous demodulator comprising a beam deflection tube having a cathode, a control electrode, a pair of deflector electrodes, and a pair of output electrodes, said control electrode being coupled to said discriminator to intensity modulate the electron beam in said tube in accordance with said modulation function; and means for applying said demodulation signal to said deflector electrodes to develop a pair of audio signals, corresponding to said audio signals A and B, at said output electrodes.

5. A transmitter for a stereo FM transmission system comprising: means for developing first and second audio signals A and B; circuit means for combining said audio signals to develop a sum signal $A+B$ and a difference signal $A-B$; a subcarrier signal generator for generating a subcarrier signal S having a frequency substantially higher than the highest audio frequency to be transmitted; means for effectively amplitude-modulating said difference signal with said subcarrier to develop a suppressed-carrier amplitude-modulated subcarrier signal; phase-shifting means, coupled to said subcarrier signal generator, for developing a phase-shifted pilot signal S′ in phase quadrature to said subcarrier; a frequency modulator; and means for effectively applying said amplitude-modulated subcarrier signal, said phase-shifted subcarrier signal, and said sum signal to said frequency modulation means to generate a transmission signal frequency-modulated in accordance with the modulation function $$M(t)=K_1(A+B)+K_2(A-B)\cos\omega_s t+K_3S'$$

where $K_1$–$K_3$ are constants.

6. A transmitter for a stereo FM transmission system comprising: means for developing first and second audio signals A and B; circuit means for combining said audio signals to develop a sum signal $A+B$ and a difference signal $A-B$; a subcarrier signal generator for generating a sinusoidal subcarrier signal S having a frequency substantially higher than the highest audio frequency to be transmitted; means for amplitude-modulating said difference signal with said subcarrier to develop a suppressed-carrier amplitude-modulated subcarrier signal; phase shifting means, coupled to said subcarrier oscillator, for developing a sinusoidal pilot signal S′ equal in frequency to said subcarrier signal but in phase quadrature relative thereto; a frequency modulator; and means for effectively applying said amplitude-modulated subcarrier signal, said pilot signal, and said sum signal to said frequency modulation means to generate a transmission signal comprising a carrier signal frequency-modulated in accordance with the modulation function $$M(t)=K_1(A+B)+K_2(A-B)\cos\omega_s t+K_3S'$$

where $K_1$–$K_3$ are constants of which constants $K_1$ and $K_2$ are approximately equal and are much larger than constant $K_3$.

7. A transmitter for a stereo FM transmission system comprising: means for developing first and second audio signals A and B; circuit means for combining said audio signals to develop a sum signal $A+B$ and a difference signal $A-B$; a subcarrier signal generator for generating a subcarrier signal S having a frequency substantially higher than the highest audio frequency to be transmitted; means for amplitude-modulating said difference signal with said subcarrier to develop a suppressed-carrier amplitude-modulated subcarrier signal; phase shifting means, coupled to said subcarrier oscillator for developing a substantially sinusoidal pilot signal S′ equal in frequency to said subcarrier signal but in phase quadrature relative thereto; a frequency modulator including two modulator stages coupled in series with each other; and means for effectively applying said sum signal to said first modulator stage and for applying said amplitude-modulated subcarrier signal and said pilot signal to said second modulator stage of said frequency modulation means to generate a transmission signal comprising a carrier signal frequency-modulated in accordance with the modulation function $$M(t)=K_1(A+B)+K_2(A-B)\cos\omega_s t+K_3S'$$

where $K_1$–$K_3$ are constants of which constants $K_1$ and $K_2$ are approximately equal and are much larger than constant $K_3$.

8. A transmitter for a stereo FM transmission system comprising: means for developing first and second audio signals A and B; circuit means for combining said audio signals to develop a sum signal $A+B$ and a difference signal $A-B$; a subcarrier signal generator for generating a subcarrier signal S′ having a frequency substantially higher than the highest audio frequency to be transmitted; a suppressed-carrier modulator for effectively amplitude-modulating said difference signal with said subcarrier to develop an amplitude-modulated signal having negligible amplitude at said subcarrier frequency; phase-shifting means, coupled to said subcarrier signal generator, for developing a phase-shifted pilot signal S′ in phase quadrature to said subcarrier; a frequency modulator; and means for effectively applying said amplitude-modulated subcarrier signal, said phase-shifted subcarrier signal, and said sum signal to said frequency modulation means to generate a transmission signal in which said carrier signal is frequency-modulated in accordance with the modulation function $$M(t)=K_1(A+B)+K_2(A-B)\cos\omega_s t+K_3S'$$

where $K_1$–$K_3$ are constants and constants $K_1$ and $K_2$ are of similar magnitude and are an order of magnitude greater than $K_3$.

9. A receiver for a stereo FM transmission system for utilizing a transmitted signal comprising a carrier frequency-modulated in accordance with the modulation function $$M(t)=K_1(A+B)+K_2(A-B)\cos\omega_s t+K_3S'$$

where A and B are audio signals, S′ is a pilot signal related to the fundamental of a suppressed-carrier amplitude-modulated subcarrier signal $K_2(A-B)\cos\omega_s t$ and $K_1$–$K_3$ are constants, comprising: a discriminator; input means for applying a received signal to said discriminator to develop a signal corresponding to said modulation function; means, comprising a band-pass filter coupled to said discriminator, for deriving a demodulation signal having a frequency S and fixed phase relation to said subcarrier; a synchronous demodulator including a beam-deflection tube having a cathode, deflector electrodes, an intensity-control electrode and a pair of output electrodes; a matrix network comprising a first resistance branch connecting one of said output electrodes to said cathode, a second resistance branch connecting the other of said output electrodes to said cathode and a cathode impedance means for coupling said discriminator to said control electrode; means for applying said demodulation signal to said deflector electrodes, and means coupled to said matrix network for developing a pair of audio signals corresponding to said audio signals A and B.

10. A receiver for a stereo FM transmission system for utilizing a transmitted signal comprising a carrier frequency-modulated in accordance with the modulation function $$M(t)=K_1(A+B)+K_2(A-B)\cos\omega_s t+K_3S'$$

where A and B are audio signals, S′ is a pilot signal related to the fundamental of a suppressed-carrier amplitude-modulated subcarrier signal $K_2(A-B)\cos\omega_s t$, and $K_1$–$K_3$ are constants, comprising: a discriminator; input means for applying a received signal to said discriminator to develop a signal corresponding to said modulation function; means, comprising a band-pass filter coupled to said discriminator, for deriving a demodulation signal having a frequency S and fixed phase relation to said subcarrier; a synchronous demodulator having two sets of input terminals and including a beam-deflection tube having deflector electrodes connected to one of said sets of input terminals, an intensity-control electrode connected to another of said sets of input terminals and further having a pair of output electrodes; means for coupling said discriminator to one of said sets of input terminals; means for applying said demodulation signal to the other of said sets of input terminals; and means coupled to said output electrodes for developing a pair of audio signals corresponding to said audio signals A and B.

11. A receiver for a stereo FM transmission system for utilizing a transmitted signal comprising a carrier frequency-modulated in accordance with the modulation function $$M(t)=K_1(A+B)+K_2(A-B)\cos \omega_s t+K_3S'$$

where A and B are audio signals, $K_2(A-B)\cos \omega_s t$ is a suppressed-carrier amplitude-modulated subcarrier signal, S′ is a pilot signal having a frequency related to the fundamental of the subcarrier but displaced 90° in phase, and $K_1$–$K_3$ are constants, comprising: a discriminator; input means for applying a received signal to said discriminator to develop a signal corresponding to said modulation function; means for generating a demodulation signal having a frequency S and locked in phase coincidence therewith, said means comprising a band pass filter coupled to said discriminator for isolating said pilot signal, a local oscillator operating at the subcarrier frequency, a phase detector coupled to said band pass filter and said oscillator, and reactance means coupled to said phase detector and said oscillator to control the phase of said oscillator in response to changes in the relative phase of said pilot signal and the output from said oscillator; a synchronous demodulator having two sets of input terminals and including a beam-deflection tube having deflector electrodes connected to one of said sets of input terminals, an intensity-control electrode connected to another of said sets of input terminals and further having a pair of output electrodes; means for coupling said discriminator to one of said sets of input terminals; means for applying said demodulation signal to the other of said sets of input terminals; and means coupled to said output electrodes for developing a pair of audio signals corresponding to said audio signals A and B.

12. A receiver for a stereo FM transmission system for utilizing a transmitted signal comprising a carrier frequency-modulated in accordance with the modulation function $$M(t)=K_1(A+B)+K_2(A-B)\cos \omega_s t+K_3S'$$

where A and B are audio signals, S′ is a pilot signal related to the fundamental of a suppressed-carrier amplitude-modulated subcarrier signal $K_2(A-B)\cos \omega_s t$ and $K_1$–$K_2$ are constants, comprising: a discriminator; input means for applying a received signal to said discriminator to develop a composite signal corresponding to said modulation function; synchronizing means for deriving a demodulation signal having a frequency S and fixed phase relation to said subcarrier; synchronous demodulator means, coupled to said discriminator and to said synchronizing means for responding conjointly to said demodulation signal and to said composite signal to develop a pair of output signals corresponding to said A and B audio signals, said demodulator means including a pair of output impedances across which demodulated signals of one polarity are developed; a load impedance across which at least the audio-frequency component of said composite signal but of opposite polarity to said demodulated signals is developed; and interconnections from said load impedance to each of said output impedances for matrixing said signals of opposed polarities.

13. A receiver for a stereo FM transmission system for utilizing a transmitted signal comprising a carrier frequency-modulated in accordance with the modulation function $$M(t)=K_1(A+B)+K_2(A-B)\cos \omega_s t+K_3S'$$

where A and B are audio signals, S′ is a pilot signal related to the fundamental of a suppressed-carrier amplitude-modulated subcarrier signal $K_2(A-B)\cos \omega_s t$, and $K_1$–$K_3$ are constants, comprising: a frequency modulation detector responsive to said received carrier for developing a composite signal corresponding to said modulation function; further detector means having a pair of load circuits, for utilizing said composite signal to develop in one of said load circuits a detected signal including A audio and unwanted signal components and to develop in the other of said load circuits a detected signal including B audio and unwanted signal components; means for matrixing said composite signal and said detected signal developed in said one load circuit to derive separated A audio; and means for matrixing said composite signal and said detected signal developed in said other load circuit to derive separated B audio.

14. A receiver for a stereo FM transmission system for utilizing a transmitted signal comprising a carrier frequency-modulated in accordance with the modulation function $$M(t)=K_1(A+B)+K_2(A-B)\cos \omega_s t+K_3S'$$

where A and B are audio signals, S′ is a pilot signal related to the fundamental of a suppressed-carrier amplitude-modulated subcarrier signal $K_2(A-B)\cos \omega_s t$, and $K_1$–$K_3$ are constants, comprising: a frequency modulation detector responsive to said received carrier for developing a composite signal corresponding to said modulation function; further detector means having a pair of load circuits, for utilizing said composite signal to develop in one of said load circuits a detected signal including A audio and unwanted signal components and to develop in the other of said load circuits a detected signal including B audio and unwanted signal components; means for deleting said unwanted signal components to derive separated A audio and separated B audio signals.

References Cited in the file of this patent

UNITED STATES PATENTS

| | | |
|---|---|---|
| 2,269,688 | Rath | Jan. 13, 1942 |
| 2,698,379 | Boelens et al. | Dec. 28, 1954 |
| 2,779,020 | Wilmotte | Jan. 22, 1957 |
| 2,851,532 | Crosby | Sept. 9, 1958 |
| 3,007,005 | Moore et al. | Oct. 31, 1961 |